United States Patent
Chan et al.

(10) Patent No.: US 9,210,390 B2
(45) Date of Patent: Dec. 8, 2015

(54) POLY-PHASE FRAME MODULATION SYSTEM

(71) Applicant: Solomon Systech Limited, Hong Kong (HK)

(72) Inventors: Wing Chi Stephen Chan, Hong Kong (HK); Wai Kin Cheng, Hong Kong (HK)

(73) Assignee: SOLOMON SYSTECH LIMITED, Hong Kong (HK)

( * ) Notice: Subject to any disclaimer, the term of this patent is extended or adjusted under 35 U.S.C. 154(b) by 383 days.

(21) Appl. No.: 13/958,624

(22) Filed: Aug. 5, 2013

(65) Prior Publication Data

US 2015/0029212 A1 Jan. 29, 2015

(30) Foreign Application Priority Data

Jul. 25, 2013 (CN) .......................... 2013 1 0316283

(51) Int. Cl.
| | |
|---|---|
| *G09G 5/02* | (2006.01) |
| *G09G 5/06* | (2006.01) |
| *G06T 5/00* | (2006.01) |
| *H04N 9/64* | (2006.01) |
| *G06T 3/00* | (2006.01) |
| *G09G 3/20* | (2006.01) |

(52) U.S. Cl.
CPC ........ *H04N 9/646* (2013.01); *G06T 3/00* (2013.01); *G09G 3/2007* (2013.01)

(58) Field of Classification Search
CPC combination set(s) only.
See application file for complete search history.

(56) References Cited

U.S. PATENT DOCUMENTS

| | | | |
|---|---|---|---|
| 6,184,854 B1 | 2/2001 | Hotto | |
| 6,288,698 B1 | 9/2001 | Ishii et al. | |
| 2009/0140967 A1* | 6/2009 | Sarmento | ................ H04L 25/14 345/98 |
| 2009/0219380 A1* | 9/2009 | Cable | ................... G03H 1/0808 348/40 |
| 2014/0028697 A1* | 1/2014 | Kurtz | ...................... G01J 3/465 345/589 |

* cited by examiner

*Primary Examiner* — Wesner Sajous

(57) ABSTRACT

A poly-phase frame modulation system includes a phase matrix look-up table being configured for generating a reference phase matrix; a first phase modulator being configured for generating a first modulated output by taking in the data from a red channel and the sum of the reference phase matrix and a frame offset; a second phase modulator being configured for generating a second modulated output by taking in the data from a green channel and the sum of the reference phase matrix, the frame offset and a first channel offset; and a third phase modulator being configured for generating a third modulated output by taking in the data from a blue channel and the sum of the reference phase matrix, the frame offset and a second channel offset.

20 Claims, 6 Drawing Sheets

Frame 0

| 2 | 6 | 5 | 4 | 0 | 1 | 3 |
|---|---|---|---|---|---|---|
| 5 | 0 | 1 | 2 | 3 | 6 | 4 |
| 0 | 3 | 4 | 6 | 5 | 2 | 1 |
| 6 | 2 | 3 | 1 | 4 | 0 | 5 |
| 1 | 4 | 0 | 5 | 6 | 3 | 2 |
| 3 | 5 | 2 | 0 | 1 | 4 | 6 |
| 4 | 1 | 6 | 3 | 2 | 5 | 0 |

Frame 1

| 3 | 0 | 6 | 5 | 1 | 2 | 4 |
|---|---|---|---|---|---|---|
| 6 | 1 | 2 | 3 | 4 | 0 | 5 |
| 1 | 4 | 5 | 0 | 6 | 3 | 2 |
| 0 | 3 | 4 | 2 | 5 | 1 | 6 |
| 2 | 5 | 1 | 6 | 0 | 4 | 3 |
| 4 | 6 | 3 | 1 | 2 | 5 | 0 |
| 5 | 2 | 0 | 4 | 3 | 6 | 1 |

Frame 6

| 1 | 5 | 4 | 3 | 6 | 0 | 2 |
|---|---|---|---|---|---|---|
| 4 | 6 | 0 | 1 | 2 | 5 | 3 |
| 6 | 2 | 3 | 5 | 4 | 1 | 0 |
| 5 | 1 | 2 | 0 | 3 | 6 | 4 |
| 0 | 3 | 6 | 4 | 5 | 2 | 1 |
| 2 | 4 | 1 | 6 | 0 | 3 | 5 |
| 3 | 0 | 5 | 2 | 1 | 4 | 6 |

Frame 2

| 4 | 1 | 0 | 6 | 2 | 3 | 5 |
|---|---|---|---|---|---|---|
| 0 | 2 | 3 | 4 | 5 | 1 | 6 |
| 2 | 5 | 6 | 1 | 0 | 4 | 3 |
| 1 | 4 | 5 | 3 | 6 | 2 | 0 |
| 3 | 6 | 2 | 0 | 1 | 5 | 4 |
| 5 | 0 | 4 | 2 | 3 | 6 | 1 |
| 6 | 3 | 1 | 5 | 4 | 0 | 2 |

Frame 5

| 0 | 4 | 3 | 2 | 5 | 6 | 1 |
|---|---|---|---|---|---|---|
| 3 | 5 | 6 | 0 | 1 | 4 | 2 |
| 5 | 1 | 2 | 4 | 3 | 0 | 6 |
| 4 | 0 | 1 | 6 | 2 | 5 | 3 |
| 6 | 2 | 5 | 3 | 4 | 1 | 0 |
| 1 | 3 | 0 | 5 | 6 | 2 | 4 |
| 2 | 6 | 4 | 1 | 0 | 3 | 5 |

Frame 3

| 5 | 2 | 1 | 0 | 3 | 4 | 6 |
|---|---|---|---|---|---|---|
| 1 | 3 | 4 | 5 | 6 | 2 | 0 |
| 3 | 6 | 0 | 2 | 1 | 5 | 4 |
| 2 | 5 | 6 | 4 | 0 | 3 | 1 |
| 4 | 0 | 3 | 1 | 2 | 6 | 5 |
| 6 | 1 | 5 | 3 | 4 | 0 | 2 |
| 0 | 4 | 2 | 6 | 5 | 1 | 3 |

Frame 4

| 6 | 3 | 2 | 1 | 4 | 5 | 0 |
|---|---|---|---|---|---|---|
| 2 | 4 | 5 | 6 | 0 | 3 | 1 |
| 4 | 0 | 1 | 3 | 2 | 6 | 5 |
| 3 | 6 | 0 | 5 | 1 | 4 | 2 |
| 5 | 1 | 4 | 2 | 3 | 0 | 6 |
| 0 | 2 | 6 | 4 | 5 | 1 | 3 |
| 1 | 5 | 3 | 0 | 6 | 2 | 4 |

FIG. 6

Modulation arrangement for data 0~228

Modulation arrangement for data 228~255

POLY-PHASE FRAME MODULATION SYSTEM

CROSS REFERENCE TO RELATED PATENT APPLICATIONS

The present application claims benefit of Chinese patent application No. 201310316283.6, which filed on Jul. 25, 2013, the entire contents of which are hereby incorporated by reference.

FIELD OF THE PATENT APPLICATION

The present patent application generally relates to digital signal processing and more specifically to a poly-phase frame modulation system for increasing the perceived color depth or the number of quantized levels of an electronic image signal.

BACKGROUND

Frame rate control (FRC) is a common technique used to increase the perceived color depth or the number of quantized levels of an electronic image signal over the original quantization limit of the electronic image signal. In the simplest form, an intermediate image grey level in between two neighboring signal quantization levels is obtained by displaying the two neighboring levels in alternate frames, thus providing an averaged grey level in visual perception. This FRC method can theoretically be carried out to display more grey levels in between by controlling the on/off ratios of the two neighboring levels over a number of frames, except for the undesirable visual flickering when pixels are designated on and off at below 50 Hz rates.

Dithering is another common technique used to increase the perceived color resolution over the signal quantization resolution. Intermediate grey or color levels are created by varying the proportion of black and white pixels or of pixels of different available quantized colors spatially. Dithering will not reduce spatial resolution and the dithered image will remain smooth and sharp as long as the dithering dimensions are below visual perception. Dithering can be done using a regular predefined pattern, a random pattern, or a pseudo random pattern. FRC and dithering can also be used together, providing an additional degree of flexibility. The dithering pattern can be changed from frame to frame.

In a conventional frame rate control system, there is color loss in high tone colors, because the generation of color sub-levels is available only between quantization levels of output signals. For example, a 6-bit TFT display panel has 64 quantization levels of an output signal in each color channel. Applying a conventional method of frame rate control can only generate 3 sub-levels between two adjacent quantization levels, making a total number of 253 levels. The total number of colors can be displayed by such a method is 253 (red)×253 (green)×253 (blue)=16.2 million. A true 8-bit TFT display panel, which has a total number of 256 quantization levels of an output signal in each color channel, can display a total number of 16.7 Million colors. Therefore, comparing with a true 8-bit TFT display panel, the 6-bit display panel with the conventional frame rate control system has a color loss of about 0.5 million colors. The color loss happens in the highest 3 levels in each color channel.

SUMMARY

The present patent application is directed to a poly-phase frame modulation system. In one aspect, the poly-phase frame modulation system includes: a phase matrix look-up table being configured for generating a reference phase matrix; a first phase modulator being configured for generating a first modulated output by taking in the data from a red channel and the sum of the reference phase matrix and a frame offset; a second phase modulator being configured for generating a second modulated output by taking in the data from a green channel and the sum of the reference phase matrix, the frame offset and a first channel offset; and a third phase modulator being configured for generating a third modulated output by taking in the data from a blue channel and the sum of the reference phase matrix, the frame offset and a second channel offset. The reference phase matrix has a dimension of N by N, where N is an odd positive integer. The elements in each row of the reference phase matrix are different from each other. The elements in each column of the reference phase matrix are different from each other. Patterns formed by elements with the same values in the reference phase matrix are mutually disjoint with each other.

The data from the red, green, and blue channels may include more bits in length than the first, second, and third modulated outputs. N may equal 7. The first, second, and third modulated outputs may respectively include six color sub-levels between two adjacent quantization levels of a display output. The poly-phase frame modulation system may further include means for generating three color sub-levels between two adjacent quantization levels of a display output using the six color sub-levels in each of the first, second, and third modulated outputs.

The poly-phase frame modulation system may further include means for rearranging high tone modulation. The means for rearranging high tone modulation may be configured to generate high tone colors non-linearly by using the six color sub-levels so as to recover loss of high-tone color levels.

For a pattern to be mutually disjoint to another pattern, the two patterns may not be able to reproduce each other by at least a row rotation, at least a column rotation, or a combination of at least a row rotation and at least a column rotation thereof.

In another aspect, the poly-phase frame modulation system includes: means for generating a reference phase matrix; means for adjusting the reference phase matrix by adding a plurality of offsets to the elements of the reference phase matrix; and means for generating color sub-levels between two adjacent quantization levels of an electronic image signal with the adjusted reference phase matrix. The reference phase matrix has a dimension of N by N, where N is an odd positive integer. The elements in each row of the reference phase matrix are different from each other. The elements in each column of the reference phase matrix are different from each other. Patterns formed by elements with the same values in the reference phase matrix are mutually disjoint with each other. For a pattern to be mutually disjoint to another pattern, the two patterns are not able to reproduce each other by at least a row rotation, at least a column rotation, or a combination of at least a row rotation and at least a column rotation thereof.

The poly-phase frame modulation system may further include: a first phase modulator being configured for generating a first modulated output by taking in the data from a red channel and the sum of the reference phase matrix and a frame offset; a second phase modulator being configured for generating a second modulated output by taking in the data from a green channel and the sum of the reference phase matrix, the frame offset and a first channel offset; and a third phase modulator being configured for generating a third modulated output by taking in the data from a blue channel and the sum of the reference phase matrix, the frame offset and a second channel offset. N may equal 7.

The first, second, and third modulated outputs may respectively include six color sub-levels between two adjacent quantization levels of an electronic image signal. The poly-phase frame modulation system may further include means for generating three color sub-levels between two adjacent quantization levels of an electronic image signal using the six color sub-levels in each of the first, second, and third modulated outputs.

The poly-phase frame modulation system may further include means for rearranging high tone modulation. The means for rearranging high tone modulation may be configured to generate high tone colors non-linearly by using the six color sub-levels so as to recover loss of high-tone color levels.

In yet another aspect, the poly-phase frame modulation system includes: means for generating a reference phase matrix based on a pixel clock signal and a horizontal synchronization signal of an input electronic image signal; means for adjusting the reference phase matrix by adding a plurality of offsets to the elements of the reference phase matrix, the offsets including a frame offset provided by a vertical synchronization signal of the input electronic image signal, a first channel offset, and a second channel offset; and means for generating color sub-levels between two adjacent quantization levels of an output electronic image signal with the adjusted reference phase matrix. The reference phase matrix has a dimension of N by N, where N is an odd positive integer. The elements in each row of the reference phase matrix are different from each other. The elements in each column of the reference phase matrix are different from each other. Patterns formed by elements with the same values in the reference phase matrix are mutually disjoint with each other.

The poly-phase frame modulation system may further include: a first phase modulator being configured for generating a first modulated output by taking in the data from a red channel of the input electronic image signal and the sum of the reference phase matrix and the frame offset; a second phase modulator being configured for generating a second modulated output by taking in the data from a green channel of the input electronic image signal and the sum of the reference phase matrix, the frame offset and the first channel offset; and a third phase modulator being configured for generating a third modulated output by taking in the data from a blue channel of the input electronic image signal and the sum of the reference phase matrix, the frame offset and the second channel offset. N may equal 7.

The first, second, and third modulated outputs may respectively include six color sub-levels between two adjacent quantization levels of an electronic image signal. The poly-phase frame modulation system may further include means for generating three color sub-levels between two adjacent quantization levels of an electronic image signal using the six color sub-levels in each of the first, second, and third modulated outputs.

The poly-phase frame modulation system may further include means for rearranging high tone modulation. The means for rearranging high tone modulation may be configured to generate high tone colors non-linearly by using the six color sub-levels so as to recover loss of high-tone color levels.

For a pattern to be mutually disjoint to another pattern, the two patterns may not be able to reproduce each other by at least a row rotation, at least a column rotation, or a combination of at least a row rotation and at least a column rotation thereof.

BRIEF DESCRIPTIONS OF THE DRAWINGS

FIG. 6 shows seven consecutive frames produced from the reference phase matrix shown in FIG. 3.

DETAILED DESCRIPTION

Reference will now be made in detail to a preferred embodiment of the poly-phase frame modulation system disclosed in the present patent application, examples of which are also provided in the following description. Exemplary embodiments of the poly-phase frame modulation system disclosed in the present patent application are described in detail, although it will be apparent to those skilled in the relevant art that some features that are not particularly important to an understanding of the poly-phase frame modulation system may not be shown for the sake of clarity.

Furthermore, it should be understood that the poly-phase frame modulation system disclosed in the present patent application is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure.

An embodiment of the present patent application provides a poly-phase frame modulation system which modulates 8-bit data from each of the RGB channels into 6-bit data, and transfers the output to a TFT display panel which accepts 6-bit from each of the RGB channel. The modulation employed a phase matrix to generate appropriate gray levels in different pixels and different frames so that a visual effect of 8-bit color is achieved by displaying 6-bit color only, while avoiding undesired artifacts at the same time. Preferably, the dimension of the phase matrix is chosen to be 7-by-7. The advantage of using 7 as the dimension is that most of the TFT inversion schemes use even number of lines or pixels as a cycle. A frame modulation scheme using even number lines or pixels as a cycle is very likely to conflict with the TFT inversion scheme, thus producing flickering effects.

Figure 1:
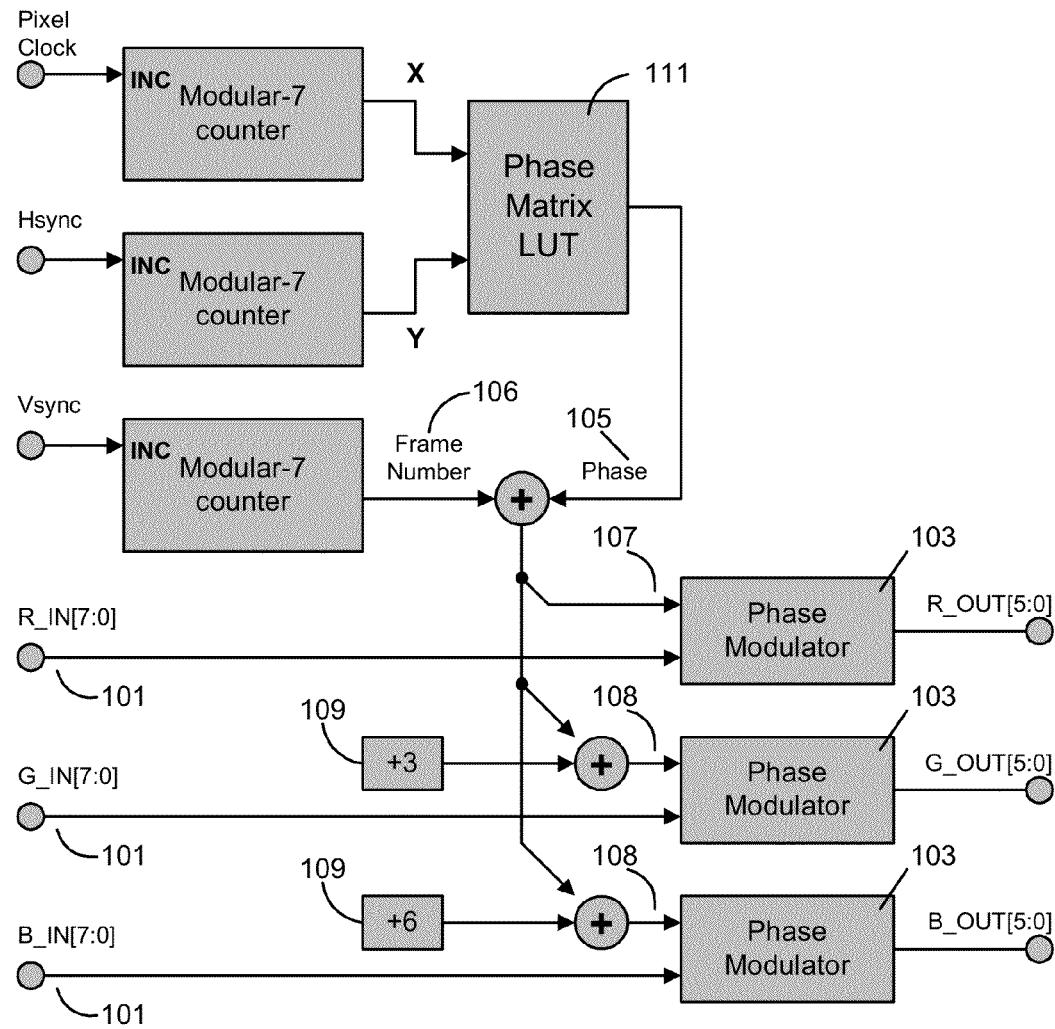
FIG. 1 is a block diagram of a poly-phase frame modulation system according to an embodiment of the present patent application.

FIG. 1 is a block diagram of a poly-phase frame modulation system according to an embodiment of the present patent application. An 8-bit data from a red channel, a green channel, and a blue channel 101 are received and applied to 3 phase modulators 103 respectively. A reference phase number 105 for each pixel is generated from a phase matrix look-up table (LUT) 111, with respect to an output from a pixel clock modulo-7 counter and a horizontal synchronization (HSYNC) modulo-7 counter. The reference phase number 105 is further added with an output from a vertical synchronization (VSYNC) modulo-7 counter to produce an actual phase number 107 for the red channel. For the green channel and the blue channel, an additional channel offset 109 is added to the phase numbers 107 to generate the actual phase numbers 108. The actual phase numbers for red channel, green channel, and blue channel are then fitted into three phase modulators 103 respectively. The phase modulators 103 generate 6-bit data for each of the RGB channels with respect to the actual phase number and the 8-bit data input.

Figure 2:
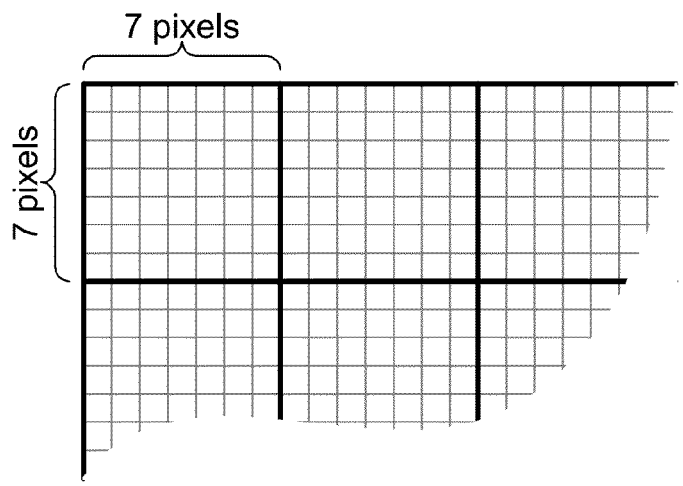
FIG. 2 shows the display area being divided into a number of segments, preferably 7-by-7 in the embodiment depicted in FIG. 1.
Figure 3:
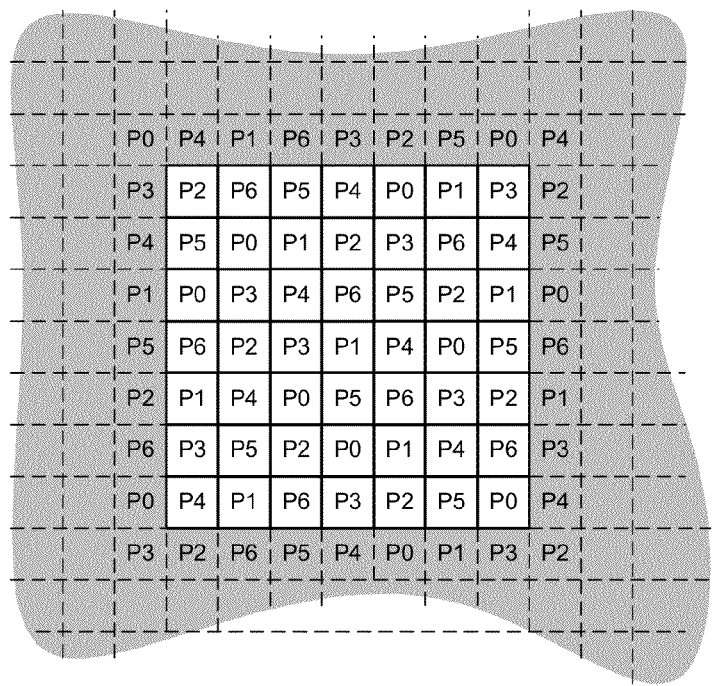
FIG. 3 is an example of an arrangement of reference phase numbers inside a reference phase matrix in the embodiment depicted in FIG. 1.

FIG. 2 shows the display area being divided into a number of segments, preferably 7-by-7 (in size of 7 pixels times 7 pixels) in the embodiment depicted in FIG. 1. The frame modulation scheme is applied to one 7-by-7 segment, and duplicated to all of the other 7-by-7 segments. The pixel clock modulo-7 counter provides a column number (corresponding to X in FIG. 1) for each 7-by-7 segment, with a range of integer number 0 to 6. The HSYNC modulo-7 counter provides a row number (corresponding to Y in FIG. 1) for each 7-by-7 segment, with a range of integer number 0 to 6. A reference phase number 105 (in FIG. 1) ranging from integer number 0 to 6 is assigned to each pixel in a 7-by-7 segment. These 49 reference phase numbers form a 7-by-7 reference phase matrix, and the matrix is stored as a 7-by-7 LUT (lookup table). In this embodiment, there are many possible arrangements of the reference phase numbers inside a reference phase matrix. However, the overall distribution of the reference phase numbers must satisfy a number of rules described hereafter. As an example, a possible arrangement of reference phase numbers inside a reference phase matrix is shown in FIG. 3.

First, a reference phase number should not repeat itself in the same row of a reference phase matrix. As shown by the example in FIG. 3, a reference phase number appears once only in each row. Consequently, each row contains all of the possible reference phase numbers. The elements in each row of the reference phase matrix are different from each other.

Second, a reference phase number cannot repeat itself in the same column of a reference phase matrix. As shown by the example in FIG. 3, a reference phase number appears once only in each column. Consequently, each column contains all of the possible reference phase numbers. The elements in each column of the reference phase matrix are different from each other.

The first and second rules together ensure an even distribution of the reference phase numbers throughout the reference phase matrix, and thus an even distribution of the reference phase numbers throughout the entire display area. However, it should be noted that these are not enough to avoid flickering artifacts, because similar patterns may be formed by a group of pixels with the same reference phase number, resulting in a "streaming line" effect when patterns are changing frame-by-frame.

Figure 4:
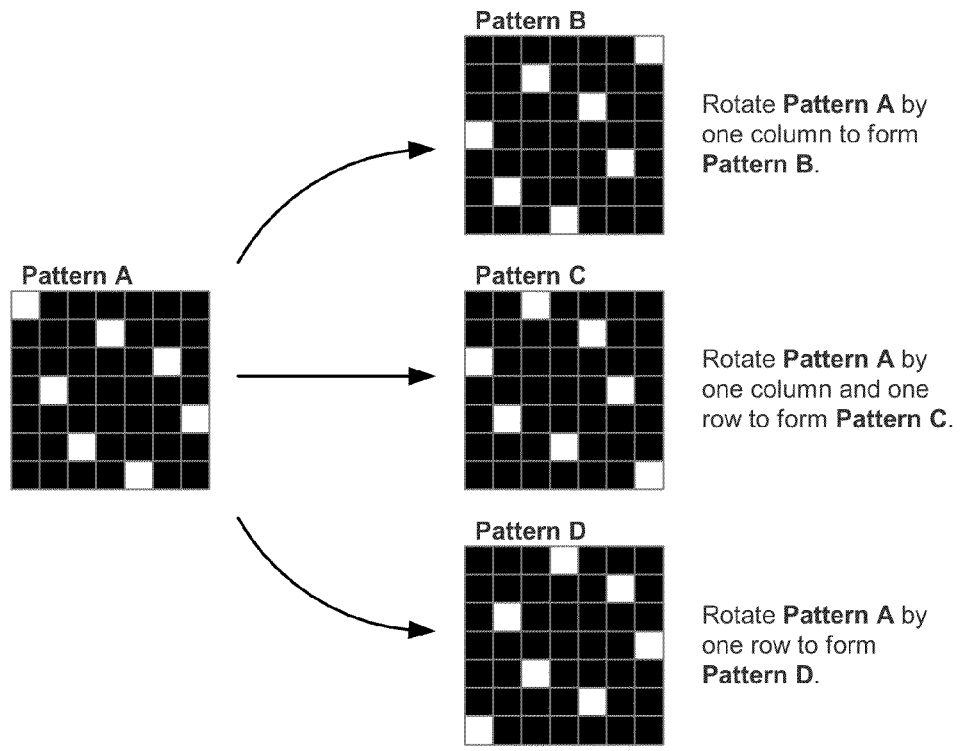
FIG. 4 is an example of "mutually joint" patterns.
Figure 5:
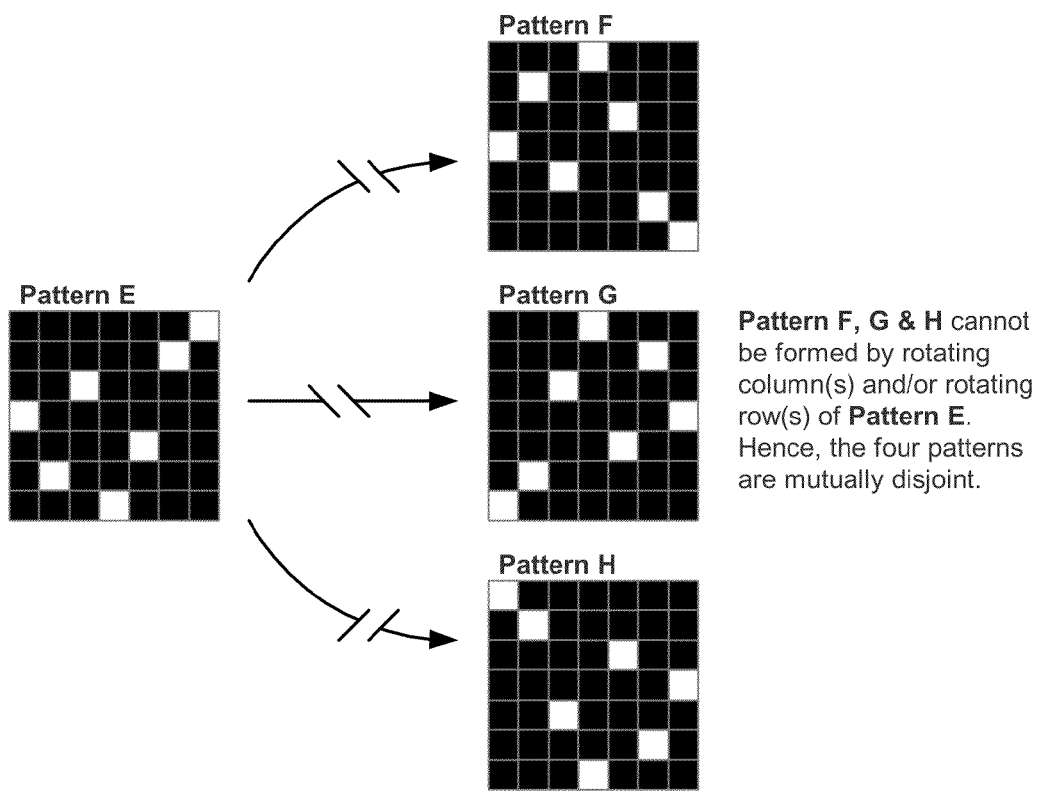
FIG. 5 is an example of "mutually disjoint" patterns.

In order to further avoid artifacts, a third rule is provided in the embodiment: patterns formed by elements with the same values (reference phase numbers) in the reference phase matrix must be "mutually disjoint" with each other. For a pattern to be mutually disjoint to another pattern, the two patterns must not be able to reproduce each other by at least a row rotation, at least a column rotation, or a combination of at least a row rotation and at least a column rotation of the patterns. As an example, patterns that are "mutually joint" are shown in FIG. 4. In FIG. 4, pattern B is formed by rotating pattern A by one column. Pattern C is formed by rotating pattern A by one column and one row. Pattern D is formed by rotating pattern A by one row. Therefore, patterns A, B C and D are mutually joint patterns. As another example, "mutually disjoint" patterns are shown in FIG. 5. In FIG. 5, patterns F, G, and H cannot be reproduced by pattern E by at least a row rotation, at least a column rotation, or a combination of at least a row rotation and at least a column rotation of pattern E. In other words, patterns F, G, and H cannot be formed by rotating column(s) and/or rotating row(s) of pattern E. Referring to FIG. 3 again, the reference phase matrix shown has 7 "mutually disjoint" patterns. The rule of "mutually disjoint" patterns ensures that the patterns in every 7 frames do not reproduce each other, thus reducing the "steaming line" effect.

Referring again to FIG. 1, the VSYNC modulo-7 counter provides a frame offset 106 to all of the reference phase numbers inside the reference phase matrix. The frame offset 106 is added to all the reference phase numbers 105 to produce an actual phase matrix (formed by the actual phase numbers) 107 for the red channel. If the sum of the frame offset and a reference phase number is larger than 6, then 7 is subtracted from the sum, so that the actual phase numbers are always ranging from 0 to 6. As an example, FIG. 6 shows seven consecutive frames produced from the reference phase matrix shown in FIG. 3.

Referring again to FIG. 1, an additional channel offset 109 is added to the green channel and the blue channel. A preferable channel offset for the green channel is 3. A preferable channel offset for blue channel is 6. After adding the frame offset 106, the channel offset 109 is added to all of the reference phase numbers to produce an actual phase matrix (formed by the actual phase numbers 108) for the green channel and the blue channel. If the sum is larger than 6, then 7 is subtracted from the sum, so that the actual phase number is always ranging from 0 to 6. The purpose of adding the additional channel offset is to reduce the size of the patterns on the display area, so that the "streaming line" effect can be further reduced.

Referring again to FIG. 1, the 8-bit color data 101 and the actual phase numbers (107 and 108) are fitted into the phase modulator 103 for each of the RGB channels. The phase modulators 103 take the 8-bit color data input and the actual phase numbers to generate 6 sub-levels. Table 1 shows the mapping to create these 6 sub-levels.

TABLE 1

|  | Level GL | Sub-level, x | | | | | | | Level GL + 1 |
| --- | --- | --- | --- | --- | --- | --- | --- | --- | --- |
|  | 0/7 | 1/7 | 2/7 | 3/7 | 4/7 | 5/7 | 6/7 | 7/7 |
| Phase 0 | GL | GL | GL | GL | GL + 1 | GL + 1 | GL + 1 | GL + 1 |
| Phase 1 | GL | GL | GL + 1 | GL + 1 | GL | GL | GL + 1 | GL + 1 |
| Phase 2 | GL | GL | GL | GL | GL + 1 | GL + 1 | GL + 1 | GL + 1 |
| Phase 3 | GL | GL + 1 | GL | GL + 1 | GL | GL + 1 | GL | GL + 1 |

TABLE 1-continued

| Level GL | Sub-level, x | | | | | | Level GL + 1 |
|---|---|---|---|---|---|---|---|
| | 0/7 | 1/7 | 2/7 | 3/7 | 4/7 | 5/7 | 6/7 | 7/7 |
| Phase 4 | GL | GL | GL | GL | GL + 1 | GL + 1 | GL + 1 | GL + 1 |
| Phase 5 | GL | GL | GL + 1 | GL + 1 | GL | GL | GL + 1 | GL + 1 |
| Phase 6 | GL | GL | GL | GL | GL + 1 | GL + 1 | GL + 1 | GL + 1 |

Referring to Table 1, GL represents the most significant 6-bit of the 8-bit color data input. GL+1 represents adding 1 to GL, which is 6-bit. To generate 1/7 sub-level, output is GL+1 for phase 3, and GL for all other phases. To generate 2/7 sub-level, output is GL+1 for phase 1 and 5, and GL for all other phases. To generate 3/7 sub-level, output is GL+1 for phase 1, 3, and 5, and GL for all other phases. To generate 4/7 sub-level, output is GL for phase 1, 3, and 5, and GL+1 for all other phases. To generate 5/7 sub-level, output is GL for phase 1 and 5, and GL+1 for all other phases. To generate 6/7 sub-level, output is GL for phase 3, and GL+1 for all other phases.

Figure 7:
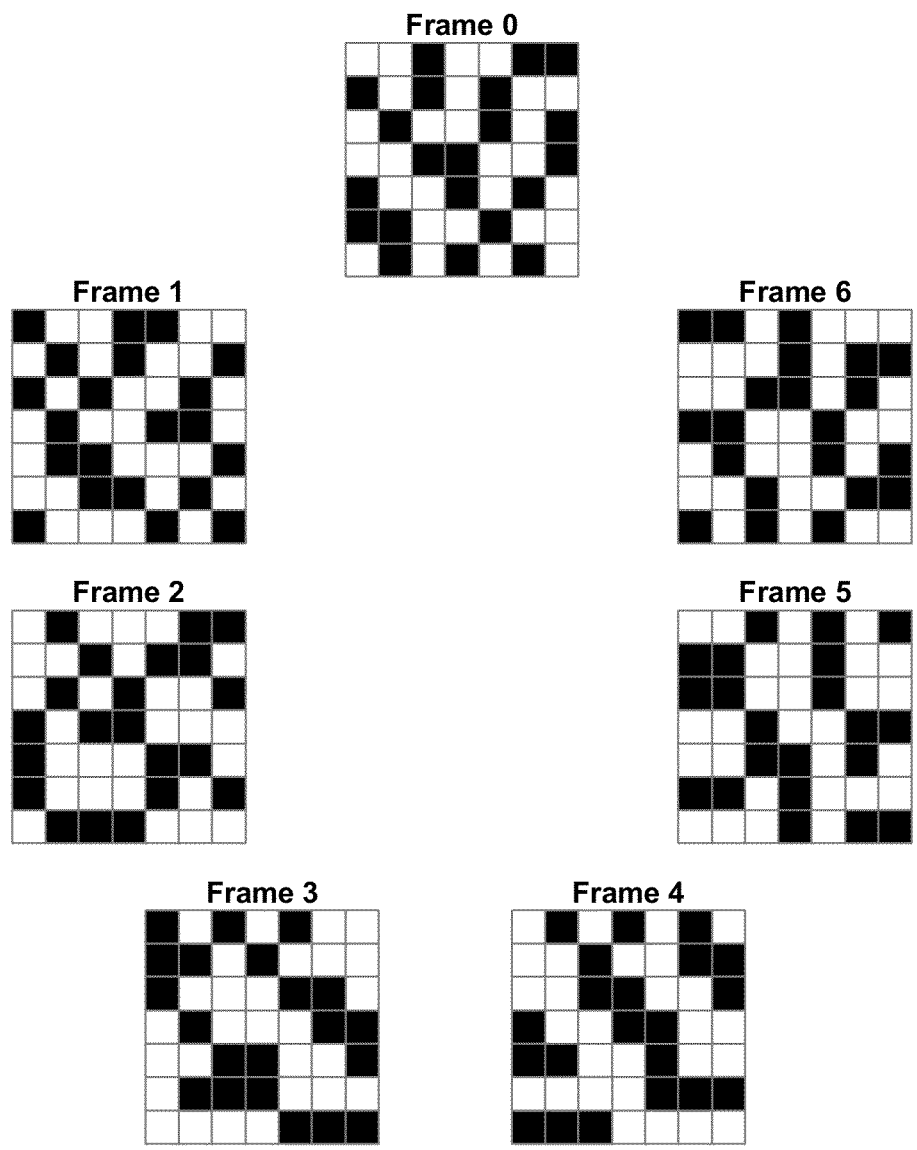
FIG. 7 shows the GL and GL+1 distribution on a 7-by-7 segment of display area at 4/7 sub-level, using the reference phase matrix in FIG. 3.

FIG. 7 shows the GL and GL+1 distribution on a 7-by-7 segment of display area at 4/7 sub-level, using the reference phase matrix in FIG. 3. Referring to FIG. 7, the white squares represent GL+1, while the black squares represent GL. By the properties of being "mutually disjoint", patterns at different frames are not correlated to each other, thus reducing the "streaming line" effects substantially.

In the above embodiment, a poly-phase frame modulation system includes: a phase matrix look-up table being configured for generating a reference phase matrix; a first phase modulator being configured for generating a first modulated output by taking in the data from a red channel and the sum of the reference phase matrix and a frame offset; a second phase modulator being configured for generating a second modulated output by taking in the data from a green channel and the sum of the reference phase matrix, the frame offset and a first channel offset; and a third phase modulator being configured for generating a third modulated output by taking in the data from a blue channel and the sum of the reference phase matrix, the frame offset and a second channel offset. The reference phase matrix has a dimension of N by N, where N is an odd positive integer. The elements in each row of the reference phase matrix are different from each other. The elements in each column of the reference phase matrix are different from each other. Patterns formed by elements with the same values in the reference phase matrix are mutually disjoint with each other. For a pattern to be mutually disjoint to another pattern, the two patterns are not able to reproduce each other by at least a row rotation, at least a column rotation, or a combination of at least a row rotation and at least a column rotation thereof.

In this embodiment, the data from the red, green, and blue channels (8-bit data) include more bits in length than the first, second, and third modulated outputs (6-bit data). N equals 7. The first, second, and third modulated outputs respectively include six color sub-levels between two adjacent quantization levels of a display output.

The poly-phase frame modulation system provided in this embodiment is designed to enhance the color depth of a 6-bit TFT display panel by 2 bits, which is equivalent in adding 3 sub-levels in between each gray level. The phase modulators 103 described above generate 6 sub-levels, and therefore, a pattern arrangement process is used to produce the 3 sub-levels from the 6 sub-levels.

Figure 8:
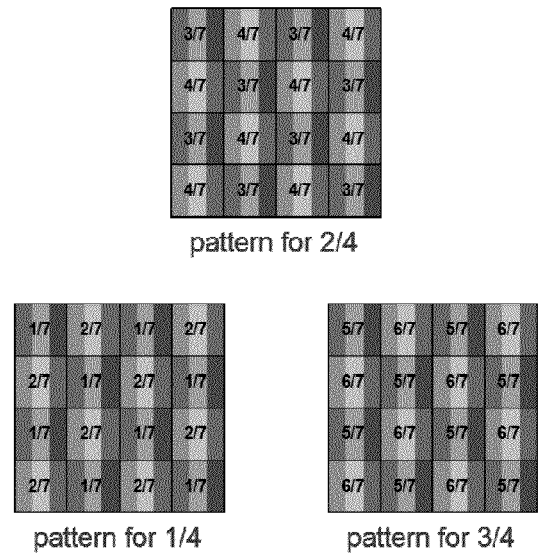
FIG. 8 shows one possible way of pattern arrangement to generate color sub-levels 1/4, 2/4, and 3/4 according to another embodiment of the present patent application.

The 3 required sub-levels are 1/4, 2/4, and 3/4, while the 6 sub-levels generated from the phase modulator 103 are 1/7, 2/7, 3/7, 4/7, 5/7, and 6/7. Realizing that 1/4 is the about average of 1/7 and 2/7, 2/4 is the exact average of 3/7 and 4/7, while 3/4 is the about average of 5/7 and 6/7, one possible way of pattern arrangement is shown in FIG. 8 according to another embodiment of the present patent application. For the required sub-level 1/4, 1/7 and 2/7 are used alternatively on adjacent pixels. For the required sub-level 2/4, 3/7 and 4/7 are used alternatively on adjacent pixels. For the required sub-level 3/4, 5/7 and 6/7 are used alternatively on adjacent pixels. This way of pattern arrangement adds complexity to the system, but the additional randomness can further improve the quality of frame modulation.

As described above, in this embodiment, the poly-phase frame modulation system further includes means for generating three color sub-levels between two adjacent quantization levels of a display output using the six color sub-levels in each of the first, second, and third modulated outputs.

There is an alternative way of pattern arrangement. Realizing that 2/7 differs from 1/4 by 1/28 only, and that 5/7 also differs from 3/4 by 1/28 only, sub-levels 2/7 and 5/7 can be used directly to substitute sub-level 1/4 and 3/4 respectively. This way of pattern arrangement reduces the complexity of the system.

Figure 9:
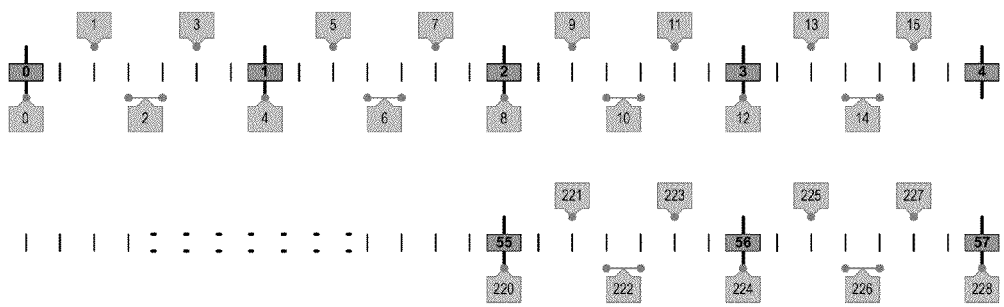
FIG. 9 illustrates a modulation rearrangement for high tone colors according to another embodiment of the present patent application.
Figure 9:
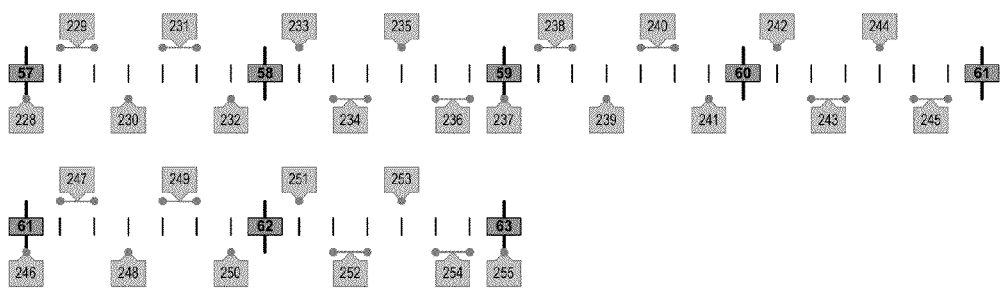

The present patent application further provides a process for high tone modulation rearrangement. For 8-bit input signal, level 0 to 228 are generated by the pattern arrangement process described above. Level 228 to 255 are generated by a different pattern arrangement process. Taking the advantage of 6 sub-levels in the present patent application, high tone colors can be generated non-linearly, so that the lost 3 levels as aforementioned can be fitted into the arrangement. One possible arrangement is shown in FIG. 9 according to another embodiment of the present patent application. For example, color levels 251 to 255 are formed by quantization levels 62 and 63 of output signal. Color level 251 is generated by sub-level 1/7 alone. Color level 252 is generated by using sub-level 2/7 and 3/7 alternatively on adjacent pixels. Color level 253 is generated by sub-level 4/7 alone. Color level 254 is generated by using sub-level 5/7 and 6/7 alternatively on adjacent pixels. Color level 255 is directly mapped to quantization level 63 of output signal.

As described above, in this embodiment, the poly-phase frame modulation system further includes means for rearranging high tone modulation. The means for rearranging high tone modulation are configured to generate high tone colors non-linearly by using the six color sub-levels so as to recover loss of high-tone color levels.

According to another embodiment of the present patent application, a poly-phase frame modulation system includes: means for generating a reference phase matrix; means for adjusting the reference phase matrix by adding a plurality of offsets to the elements of the reference phase matrix; and means for generating color sub-levels between two adjacent quantization levels of an electronic image signal with the adjusted reference phase matrix. The reference phase matrix has a dimension of N by N, where N is an odd positive integer. The elements in each row of the reference phase matrix are different from each other. The elements in each column of the reference phase matrix are different from each other. Patterns formed by elements with the same values in the reference phase matrix are mutually disjoint with each other. For a pattern to be mutually disjoint to another pattern, the two patterns are not able to reproduce each other by at least a row rotation, at least a column rotation, or a combination of at least a row rotation and at least a column rotation thereof.

According to yet another embodiment of the present patent application, a poly-phase frame modulation system includes means for generating a reference phase matrix based on a pixel clock signal and a horizontal synchronization signal of an input electronic image signal; means for adjusting the reference phase matrix by adding a plurality of offsets to the elements of the reference phase matrix, the offsets including a frame offset provided by a vertical synchronization signal of the input electronic image signal, a first channel offset, and a second channel offset; and means for generating color sub-levels between two adjacent quantization levels of an output electronic image signal with the adjusted reference phase matrix. The reference phase matrix has a dimension of N by N, where N is an odd positive integer. The elements in each row of the reference phase matrix are different from each other. The elements in each column of the reference phase matrix are different from each other. Patterns formed by elements with the same values in the reference phase matrix are mutually disjoint with each other.

The techniques used in the embodiments of the present patent application can be applied to other systems with different input bit-widths, different output bit-widths, and different phase matrix dimensions.

While the present patent application has been shown and described with particular references to a number of embodiments thereof, it should be noted that various other changes or modifications may be made without departing from the scope of the present invention.

What is claimed is:

1. A poly-phase frame modulation system comprising:
a phase matrix look-up table being configured for generating a reference phase matrix;
a first phase modulator being configured for generating a first modulated output by taking in the data from a red channel and the sum of the reference phase matrix and a frame offset;
a second phase modulator being configured for generating a second modulated output by taking in the data from a green channel and the sum of the reference phase matrix, the frame offset and a first channel offset; and
a third phase modulator being configured for generating a third modulated output by taking in the data from a blue channel and the sum of the reference phase matrix, the frame offset and a second channel offset; wherein:
the reference phase matrix has a dimension of N by N, where N is an odd positive integer;
the elements in each row of the reference phase matrix are different from each other;
the elements in each column of the reference phase matrix are different from each other; and
patterns formed by elements with the same values in the reference phase matrix are mutually disjoint with each other.

2. The poly-phase frame modulation system of claim 1, wherein the data from the red, green, and blue channels comprise more bits in length than the first, second, and third modulated outputs.

3. The poly-phase frame modulation system of claim 1, wherein N equals 7.

4. The poly-phase frame modulation system of claim 3, wherein the first, second, and third modulated outputs respectively comprise six color sub-levels between two adjacent quantization levels of a display output.

5. The poly-phase frame modulation system of claim 4 further comprising means for generating three color sub-levels between two adjacent quantization levels of a display output using the six color sub-levels in each of the first, second, and third modulated outputs.

6. The poly-phase frame modulation system of claim 4 further comprising means for rearranging high tone modulation, wherein the means for rearranging high tone modulation are configured to generate high tone colors non-linearly by using the six color sub-levels so as to recover loss of high-tone color levels.

7. The poly-phase frame modulation system of claim 1, wherein for a pattern to be mutually disjoint to another pattern, the two patterns are not able to reproduce each other by at least a row rotation, at least a column rotation, or a combination of at least a row rotation and at least a column rotation thereof.

8. A poly-phase frame modulation system comprising:
means for generating a reference phase matrix;
means for adjusting the reference phase matrix by adding a plurality of offsets to the elements of the reference phase matrix; and
means for generating color sub-levels between two adjacent quantization levels of an electronic image signal with the adjusted reference phase matrix; wherein:
the reference phase matrix has a dimension of N by N, where N is an odd positive integer;
the elements in each row of the reference phase matrix are different from each other;
the elements in each column of the reference phase matrix are different from each other;
patterns formed by elements with the same values in the reference phase matrix are mutually disjoint with each other; and
for a pattern to be mutually disjoint to another pattern, the two patterns are not able to reproduce each other by at least a row rotation, at least a column rotation, or a combination of at least a row rotation and at least a column rotation thereof.

9. The poly-phase frame modulation system of claim 8 further comprising: a first phase modulator being configured for generating a first modulated output by taking in the data from a red channel and the sum of the reference phase matrix and a frame offset; a second phase modulator being configured for generating a second modulated output by taking in the data from a green channel and the sum of the reference phase matrix, the frame offset and a first channel offset; and a third phase modulator being configured for generating a third modulated output by taking in the data from a blue channel and the sum of the reference phase matrix, the frame offset and a second channel offset.

10. The poly-phase frame modulation system of claim 8, wherein N equals 7.

11. The poly-phase frame modulation system of claim 10, wherein the first, second, and third modulated outputs respectively comprise six color sub-levels between two adjacent quantization levels of an electronic image signal.

12. The poly-phase frame modulation system of claim 11 further comprising means for generating three color sub-levels between two adjacent quantization levels of an electronic image signal using the six color sub-levels in each of the first, second, and third modulated outputs.

13. The poly-phase frame modulation system of claim 11 further comprising means for rearranging high tone modulation, wherein the means for rearranging high tone modulation are configured to generate high tone colors non-linearly by using the six color sub-levels so as to recover loss of high-tone color levels.

14. A poly-phase frame modulation system comprising:
means for generating a reference phase matrix based on a pixel clock signal and a horizontal synchronization signal of an input electronic image signal;
means for adjusting the reference phase matrix by adding a plurality of offsets to the elements of the reference phase matrix, the offsets comprising a frame offset provided by a vertical synchronization signal of the input electronic image signal, a first channel offset, and a second channel offset; and
means for generating color sub-levels between two adjacent quantization levels of an output electronic image signal with the adjusted reference phase matrix;
wherein:
the reference phase matrix has a dimension of N by N, where N is an odd positive integer;
the elements in each row of the reference phase matrix are different from each other;
the elements in each column of the reference phase matrix are different from each other; and
patterns formed by elements with the same values in the reference phase matrix are mutually disjoint with each other.

15. The poly-phase frame modulation system of claim 14 further comprising: a first phase modulator being configured for generating a first modulated output by taking in the data from a red channel of the input electronic image signal and the sum of the reference phase matrix and the frame offset; a second phase modulator being configured for generating a second modulated output by taking in the data from a green channel of the input electronic image signal and the sum of the reference phase matrix, the frame offset and the first channel offset; and a third phase modulator being configured for generating a third modulated output by taking in the data from a blue channel of the input electronic image signal and the sum of the reference phase matrix, the frame offset and the second channel offset.

16. The poly-phase frame modulation system of claim 14, wherein N equals 7.

17. The poly-phase frame modulation system of claim 16, wherein the first, second, and third modulated outputs respectively comprise six color sub-levels between two adjacent quantization levels of an electronic image signal.

18. The poly-phase frame modulation system of claim 17 further comprising means for generating three color sub-levels between two adjacent quantization levels of an electronic image signal using the six color sub-levels in each of the first, second, and third modulated outputs.

19. The poly-phase frame modulation system of claim 17 further comprising means for rearranging high tone modulation, wherein the means for rearranging high tone modulation are configured to generate high tone colors non-linearly by using the six color sub-levels so as to recover loss of high-tone color levels.

20. The poly-phase frame modulation system of claim 14, wherein for a pattern to be mutually disjoint to another pattern, the two patterns are not able to reproduce each other by at least a row rotation, at least a column rotation, or a combination of at least a row rotation and at least a column rotation thereof.

* * * * *